United States Patent
Zambri et al.

(10) Patent No.: US 8,289,652 B2
(45) Date of Patent: Oct. 16, 2012

(54) COMPACT MICROACTUATOR HEAD ASSEMBLY

(75) Inventors: Razman Zambri, Eden Prairie, MN (US); Michael Allen Greminger, St. Anthony, MN (US); John Stuart Wright, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 35 days.

(21) Appl. No.: 12/910,196

(22) Filed: Oct. 22, 2010

(65) Prior Publication Data

US 2012/0099226 A1    Apr. 26, 2012

(51) Int. Cl.
    *G11B 5/56* (2006.01)
(52) U.S. Cl. .................................... 360/234.5
(58) Field of Classification Search ............... 360/234.5
    See application file for complete search history.

(56) References Cited

U.S. PATENT DOCUMENTS

| | | | | |
|---|---|---|---|---|
| 5,844,751 | A * | 12/1998 | Bennin et al. | 360/244.3 |
| 5,847,902 | A * | 12/1998 | Clifford et al. | 360/245.6 |
| 5,943,189 | A | 8/1999 | Boutaghou et al. | |
| 6,118,637 | A | 9/2000 | Wright et al. | |
| 6,376,964 | B1 * | 4/2002 | Young et al. | 310/311 |
| 6,512,659 | B1 | 1/2003 | Hawwa et al. | |
| 6,617,763 | B2 | 9/2003 | Mita et al. | |
| 6,703,767 | B1 | 3/2004 | Summers | |
| 7,057,857 | B1 * | 6/2006 | Niu et al. | 360/245.4 |
| 7,256,967 | B2 | 8/2007 | Yao et al. | |
| 7,298,593 | B2 | 11/2007 | Yao et al. | |
| 7,609,487 | B2 | 10/2009 | Yao et al. | |
| 7,733,607 | B2 * | 6/2010 | Yao et al. | 360/245 |
| 2006/0193087 | A1 | 8/2006 | Yao et al. | |
| 2007/0139823 | A1 | 6/2007 | Yao et al. | |
| 2007/0153429 | A1 | 7/2007 | Yao et al. | |
| 2008/0144225 | A1 | 6/2008 | Yao et al. | |
| 2009/0244786 | A1 | 10/2009 | Hatch | |
| 2009/0290263 | A1 | 11/2009 | Yao et al. | |

OTHER PUBLICATIONS

H. Kuwajima, H. Uchiyama, Y. Ogawa, H. Kita and K. Matsuoka, "Manufacturing process of piezoelectric thin film dual-stage actuator and its reliability for HDD," Intermag 2002, pp. 1-3, DP04, Matsushita Electric Industrial Co., Ltd., Japan.

H. Kuwajima and K. Matsuoka, "Thin Film Piezoelectric Dual-Stage Actuator for HDD," pp. 1-3, BS-04, Matsushita Electric Industrial Co., Ltd., Japan.

K. Mossi, R. Bryant and P. Mane, "Piezoelectric Composites as Bender Actuators," Integrated Ferroelectrics, Feb. 2005, pp. 221-232, Taylor & Francis, Inc., US.

Q.-M. Wang and L. Cross, "Determination of Young's modulus of the reduced layer of a piezoelectric RAINBOW actuator," Journal of Applied Physics, May 15, 1998, pp. 5358-5363, vol. 83, No. 10, American Institute of Physics, US.

* cited by examiner

*Primary Examiner* — Mark Blouin

(74) *Attorney, Agent, or Firm* — Hall Estill Attorneys at Law

(57) ABSTRACT

Method and apparatus for a head gimbal assembly (HGA) which incorporates a microactuator. In accordance with various embodiments, a gimbal assembly has a gimbal island disposed within an aperture of a gimbal plate, which is mechanically decoupled from the gimbal island. At least one microactuator element is attached between the gimbal island and the gimbal plate to allow rotation of the gimbal island independent of the gimbal plate. The gimbal assembly is suspended from a dimple which extends from the gimbal island.

20 Claims, 10 Drawing Sheets

FIG. 4A
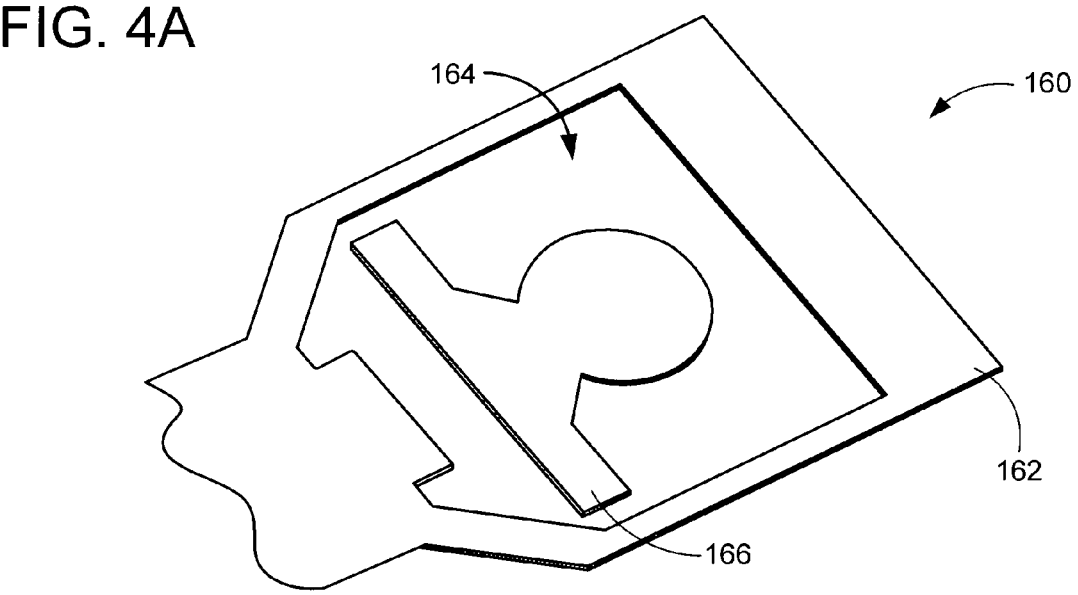
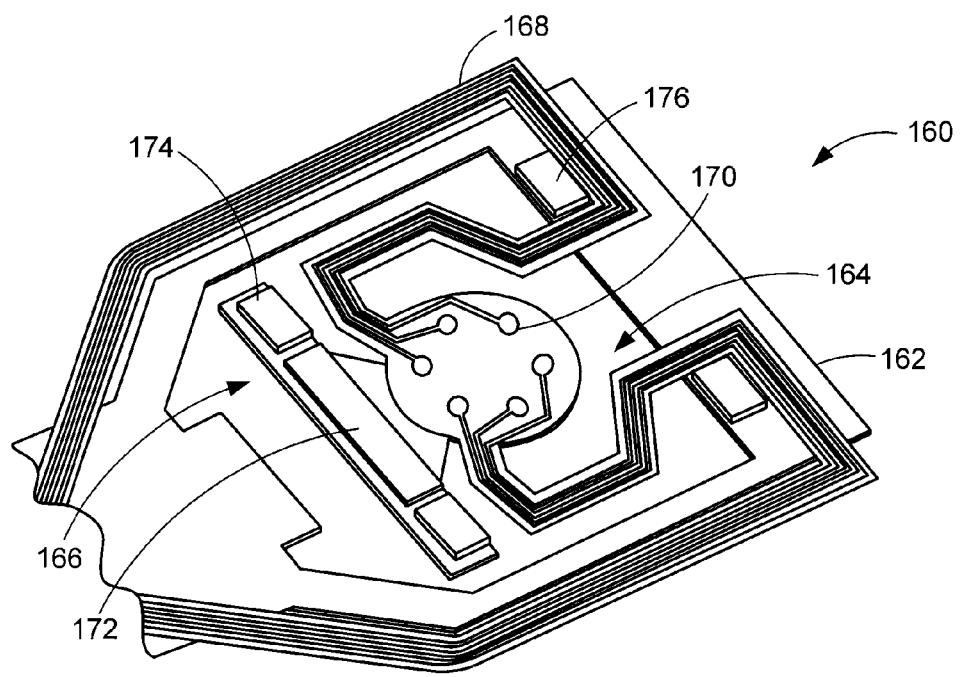
FIG. 4B

COMPACT MICROACTUATOR HEAD ASSEMBLY

SUMMARY

Various embodiments of the present invention are generally directed to an apparatus and methods for making and using a head gimbal assembly with a compact microactuator configuration.

In accordance with exemplary embodiments, a head gimbal assembly has a gimbal island disposed within an aperture of a gimbal plate so that the gimbal island is mechanically decoupled from the gimbal plate in the aperture. A piezoelectric actuator is attached between the gimbal island and the gimbal plate to allow rotation of the gimbal island independent of the gimbal plate. The head gimbal assembly is suspended from a dimple which extends from the gimbal island.

These and other features and aspects which characterize various embodiments of the present invention can be understood in view of the following detailed discussion and the accompanying drawings.

BRIEF DESCRIPTION OF THE DRAWINGS

FIGS. 4A-4D provide an exemplary construction of a head gimbal assembly in accordance with various embodiments of the present invention.

DETAILED DESCRIPTION

The present disclosure relates to microactuator based head gimbal assemblies (HGAs). As will be recognized by those skilled in the art, data storage devices can be provisioned with a rotatable medium to which data are stored along a number of concentric tracks. A head gimbal assembly (HGA) allows precise positioning of a data read/write transducer adjacent the tracks by allowing the transducer to gimbal along multiple axes to follow the topography of the media surface.

Microactuators have been proposed for use with HGAs to reduce resonance modes of the assemblies and to provide second order positional control capabilities. Microactuators can be formed from piezoelectric (PZT) or other materials to induce controlled rotation of the HGA transducer. While operable, limitations associated with current microactuator designs can include the need for increased HGA stack heights, the introduction of asymmetric drive and resonance characteristics, increased HGA preload force concentrations, and the need for an additional interposer structure in the HGA to separately route the electrical control signals to the microactuator and the slider.

Various embodiments of the present invention are accordingly directed to an improved microactuator HGA structure. As explained below, the improved structure is easy to manufacture and operate, and can be configured to reduce or eliminate many of the shortcomings of current designs such as those set forth above.

Figure 1:
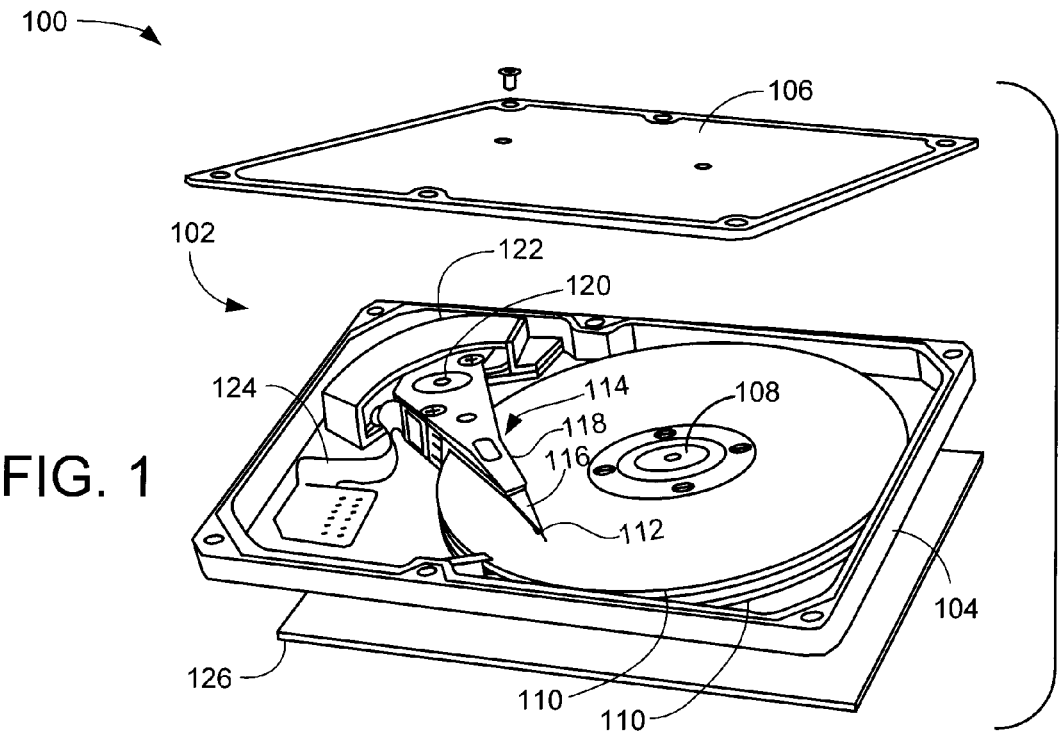
FIG. 1 provides an exploded view of an exemplary data storage device.

FIG. 1 provides a top perspective view of a disc drive data storage device 100. The device 100 is provided to show an exemplary environment in which various embodiments of the present invention can be advantageously practiced. It will be understood, however, that the claimed invention is not so limited.

The device 100 includes a sealed housing 102 formed from a base deck 104 and top cover 106. An internally disposed spindle motor 108 is configured to rotate a number of storage media 110. The media 110 are accessed by a corresponding array of data transducers that are each supported by a head gimbal assembly (HGA) 112. While FIG. 1 shows the use of two magnetic recording discs and four corresponding heads, other numbers of heads and discs (such as a single disc, etc.) and other types of media (such as optical media, etc.) can alternatively be utilized as desired.

Each HGA 112 is preferably supported by a head-stack assembly 114 ("actuator") that includes a flexible suspension assembly 116, which in turn is supported by a rigid actuator arm 118. The actuator 114 preferably pivots about a cartridge bearing assembly 120 through application of current to a voice coil motor (VCM) 122. In this way, controlled operation of the VCM 122 causes the transducers of the HGA 112 to align with tracks (not shown) defined on the media surfaces to store data thereto or retrieve data therefrom.

A printed circuit cable 124 facilitates electrical communication between the actuator 114 and device control electronics on an externally disposed device printed circuit board (PCB) 126. The printed circuit cable 124 can comprise multiple circuits that allow communication of several different components of the data storage device 100 with the PCB 126.

Figure 2:
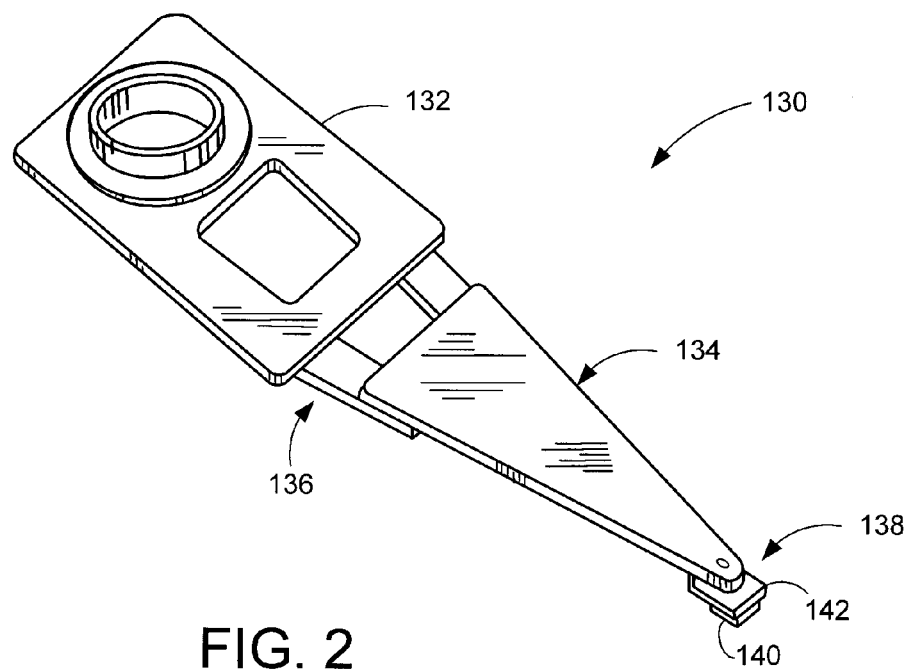
FIG. 2 depicts an exemplary suspension portion of the data storage device of FIG. 1.

FIG. 2 is an isometric view of an exemplary suspension assembly 130 that can be used in the data storage device of FIG. 1. The suspension assembly 130 has a base 132 supporting a load beam 134 via a preload bend section 136. An HGA 138 is supported at the distal end of the load beam 134 and includes a data transducer (head) 140 gimbaled for multi-axial rotation along pitch (x-axis) and roll (y-axis) directions via a gimbal plate 142 and dimple (not separately shown).

The head 140 includes a slider having a bearing surface facing the associated media surface. The bearing surface interacts with fluidic currents established by high speed rotation of the media surface to hydrodynamically support the slider adjacent the surface. Such bearing surfaces are often referred to as "air bearing" surfaces even when a different fluid other than atmospheric air is retained within the housing 102 (e.g., an inert gas such as a helium). Read and write data transducing elements are mounted to the slider such as along a trailing edge thereof to transduce data from/to the media surface.

Controlled articulation of the head 140 can be implemented by incorporating a microactuator into the HGA 138.

For example, a direct drive microactuator design can be constructed on the suspension assembly 130 to induce deflection of the head 140 in a predetermined direction. Such deflection can include rotational movement that allows the head 140 to rotate without inducing movement of the load beam 134.

To induce the rotational deflection, piezoelectric elements that deform upon activation can be positioned atop the head 140 between the head and the load beam 134. However, this can lead to a number of problems such as increased vertical height of the HGA. As will be appreciated, an increased vertical distance from the recordable medium to an axis of movement of the HGA can contribute to off-track motion and windage induced vibration. Such placement and operation of the microactuator can also produce asymmetric characteristics that cause resonance modes about the suspension.

Furthermore, inclusion of a microactuator in the HGA can result in the microactuator elements themselves carrying large loads and being damaged during events such as operational shock. A separate electrical interconnection member, such as an interposer, may be required to facilitate connection with the microactuator, and this can add further complexity to the HGA both in assembly and in operation due to added windage vibration and resonance mode excitation.

Figure 3A:
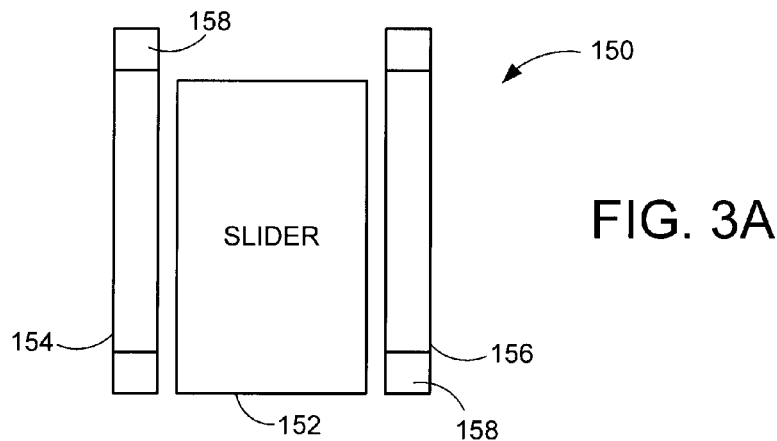
FIGS. 3A-3C illustrate exemplary operation of a head gimbal assembly in accordance with various embodiments of the present invention.
Figure 3B:
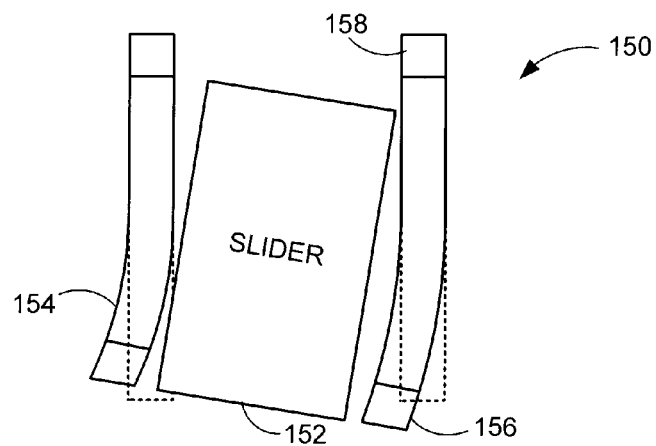
Figure 3C:
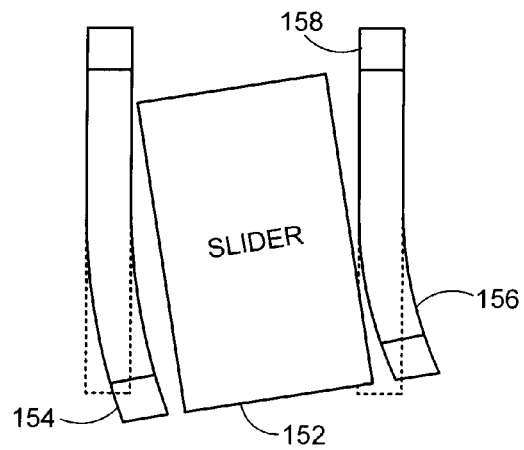

Accordingly, FIGS. 3A-3C generally illustrate block representations of an HGA 150 having a novel microactuator structure in accordance with various embodiments of the present invention. It will be appreciated that FIGS. 3A-3C are simplified schematic drawings; further details concerning the interconnection of the microactuator structure within the HGA will be presented below.

A slider 152 is disposed between first and second microactuator elements 154 and 156 that each have multiple portions attached to underlying structure (not shown). When the microactuator elements 154 and 156 are not activated, the slider will be in a default position, as shown in FIG. 3A, which can be a predetermined angular relationship with an attached load beam, such as load beam 134 of FIG. 2.

As shown in FIG. 3B, the microactuator elements 154 and 156 can be activated to deflect in a first predetermined direction. Such deflection can be produced by concurrently elongating the second microactuator element 156 while shrinking the first microactuator element 154, as displayed by the segmented lines representing the default microactuator positions. This deflection of the microactuator elements induces rotation of the slider 152 (in this case, clockwise rotation). FIG. 3C shows deflection of the slider 152 in a second predetermined direction opposite the first direction of FIG. 3B, with element 154 elongated and element 156 contracted.

It should be noted that the activation of the microactuator elements 154 and 156 can be achieved independently or in combination through the application of a predetermined amount of voltage to the elements. In some embodiments, the first microactuator element is configured with a positive polarity while the second microactuator element has a negative polarity. The opposing polarities can allow for a common voltage to be sent to each microactuator element 154 and 156 to induce opposing action, such as extension and contraction.

In other embodiments, independent voltages are sent to each microactuator element 154 and 156 to induce different amounts of rotational deflection for the slider 152. That is, an increased voltage to the first microactuator element 154 in FIG. 3C compared to the second microactuator element 156 can produce a smaller angular rotation of the slider 152 due to the reduction in shrinkage for the second element 156. Therefore, rotation of the slider 152 can be precisely manipulated through various configurations of electronic signals sent to the microactuator elements 154 and 156.

The polarity of voltage applied to the microactuator elements 154 and 156 can further provide means for manipulating rotation of the slider 152. For example, a voltage can be applied to the first microactuator element 154 with a positive voltage applied to the top surface of the element while a negative voltage is applied to the bottom surface of the element thereby producing a predetermined extension or shrinkage. The second microactuator element 156 may have the opposing configuration with a positive voltage applied to the bottom surface and a negative voltage applied to the top surface. Such variety of possible connections and activation means further allows for intricate articulation of the slider 152 merely with transmission of signals to the microactuator elements 154 and 156.

While the various rotational articulation of the slider 152 is provided in FIGS. 3A-3C, the microactuator elements and slider 154, 156, and 152 are components in an HGA that is configured to suspend over a rotating storage medium to transduce data. An exemplary HGA 160 is constructed in FIGS. 4A-4D that can suspend the microactuator elements and slider of FIGS. 3A-3C adjacent a storage medium while allowing precise rotational actuation of the slider.

FIG. 4A displays an exemplary HGA 160 structure constructed in accordance with various embodiments. A gimbal plate 162 is one such structural component that is configured with an aperture 164 that extends through the thickness of the plate 162. A gimbal island 166 is disposed within the aperture 164 of the gimbal plate 162, and is a separate member not mechanically coupled to the plate 162. That is, the gimbal island 166 is mechanically decoupled from the gimbal plate 162 to allow the island 166 to move independently of the plate 162 as will be discussed below.

At this point it will be noted that the term "decoupled" as used herein means a separate member that is physically detached from another member so as to be in non-contacting relation therewith and allow independent movement of the respective members. For example, the gimbal island 166 in FIG. 4A is decoupled from the gimbal plate 162 so that, as a separate component, it can rotate and deflect without inducing stress on the plate 162.

It should be noted that the size and shape of the gimbal island 166 and gimbal plate 162 as shown in FIGS. 4A-4D are neither required nor limited. In various embodiments, the island 166 is configured to allow the maximum rotational movement of the center of the island 166. In other embodiments, portions of the gimbal plate 162 are adapted to allow maximum rotational movement of the gimbal island 166.

FIG. 4B further constructs the HGA 160 by attaching a flex circuit 168 capable of transferring electric signals to electrodes 170 on the gimbal island 166. The gimbal island 166 is suspended by the flex circuit 168 while remaining decoupled from the gimbal plate 162. As such, movement of the gimbal island 166 will result in corresponding movement of at least a portion of the flex circuit 168. In some embodiments, the entire length of the flex circuit 168 is elastic and can maintain multiple circuit pathways that may correspond to independent circuits and interconnected circuits that are connected to components of the HGA 160 by one or more electrodes 170.

As shown, six independent circuits are located on the flex circuit 168 and have six corresponding electrodes 170 that can be electrically interconnected to a single component, such as a data transducing head, or multiple components, such as microactuators. The gimbal island 166 can have a first attachment pad 172 disposed between multiple second attachment pads 174 on a predetermined portion of the island 166. A pair of third attachment pads 176 are positioned on the gimbal plate 162 in alignment with the second attachment pads 174.

Figure 4C:
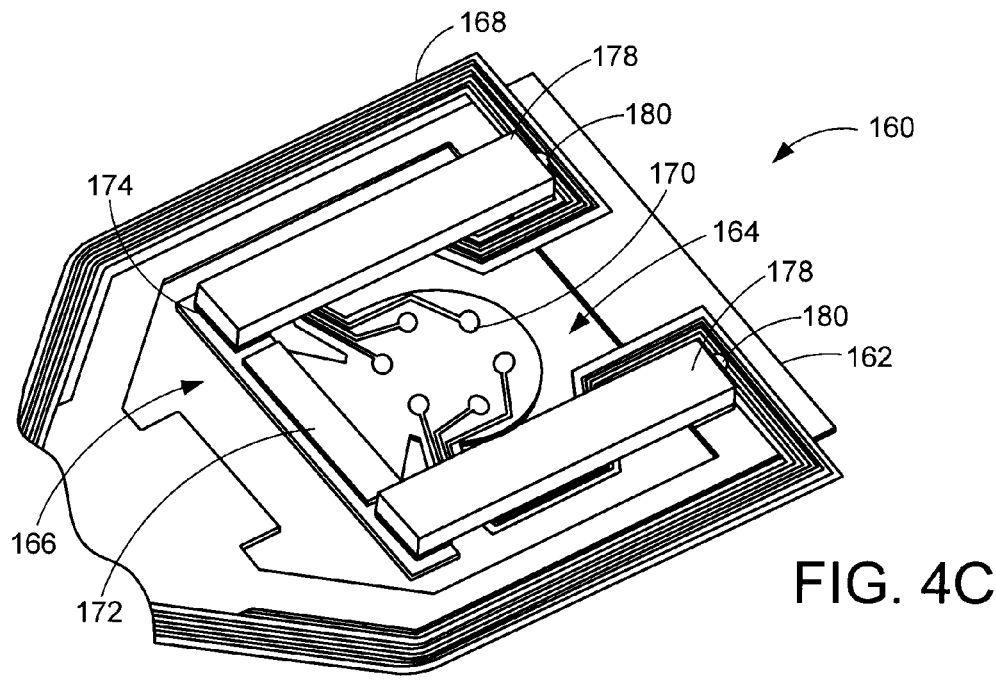
Figure 4D:
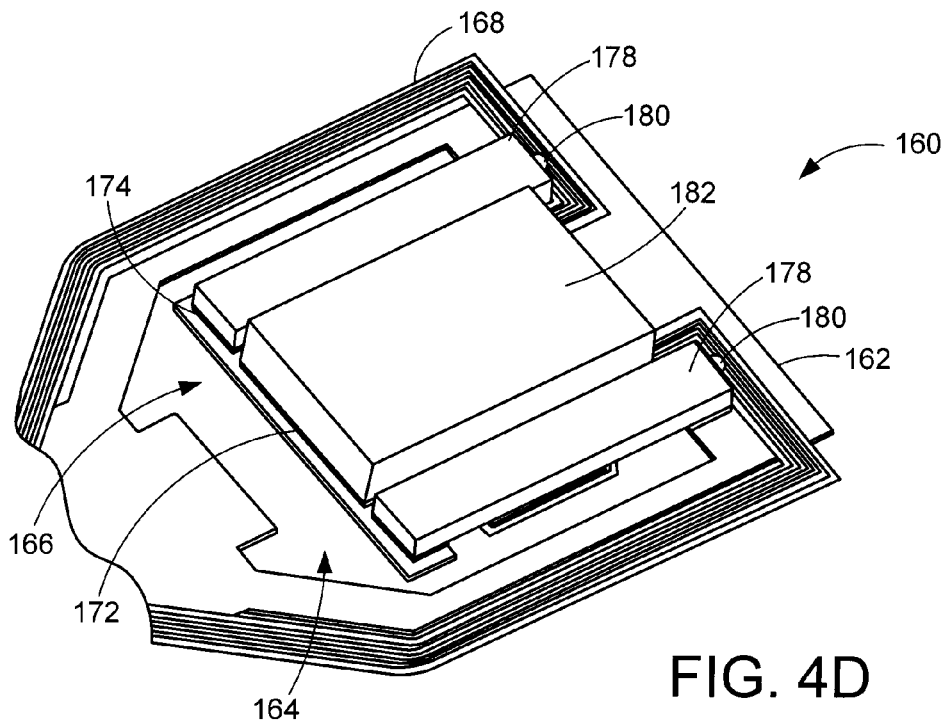

The configuration of the predetermined portion of the island 166 as well as the number and type of attachment pads are not limited to the embodiment shown in FIGS. 4B-4D and can be modified as desired without deterring from the spirit of the present disclosure. For example, the first attachment pad 172 can be an epoxy or other dielectric adhesive material while the second and third attachment pads 174 and 176 can be magnetic or physical fasteners.

In FIG. 4C, the HGA 160 has microactuators 178 connected to the second attachment pads 174 of the gimbal island 166 and the third attachment pads 176 of the gimbal plate 162. In various embodiments, each microactuator 178 is constructed of a piezoelectric material and is connected to a portion of the flex circuit 168 via nodes 180 on the gimbal plate 162. While the size, composition, and configuration of the microactuators 178 is not limited, attachment of the microactuators 178 to both the gimbal island and plate 166 and 162 can allow the island 166 to be deflected by corresponding movement of one or both of the microactuators 178.

The gimbal island 166 remains mechanically decoupled from the gimbal plate 162 but has a cantilevered connection to the plate 162 through the microactuators 178. As the microactuators 178 are activated, the gimbal island 166 will rotate and deflect, such as shown in FIGS. 3A-3C, while maintaining a mechanically decoupled relationship with the gimbal plate 166.

Such decoupled relationship is further maintained by connecting each microactuator 178 directly to the flex circuit 168 with the node 180 that is positioned on the gimbal plate 162. With the flex circuit 168 configuration of FIGS. 4B-4D, the flex circuit 168 may deform as movement of the gimbal island 166 relative to the plate 162 is induced by the microactuators 178. However, the deformation of the flex circuit 168 does not stress or deflect the nodes 180 due to the decoupled relationship between the island and the plate 166 and 162. As such, a separate support component, such as an interposer, is unnecessary to establish the requisite electrical interconnections with the microactuators 178. Activation of the microactuators induce extension and/or contraction as previously discussed.

In some embodiments, the microactuators 178 are positioned to operate in an extension mode during activation. Such extension can provide more stable and precise gimbal island 166 actuation as compared to prior orientations that place the microactuators on their sides with the height surface abutting the attachment pads.

FIG. 4D further shows the HGA 160 to include an attached transducer to the first attachment pad 172 of the gimbal island 166 and connecting the various electrodes 170 (not shown) to the slider 182. As can be appreciated, the transducer includes a slider 182 with an air bearing surface and can include a number of magnetic and/or optical transducing components having the capability to read data from and/or write data to a storage medium.

The attachment of the slider 182 to the various electrodes 170 and not any portion of the gimbal plate 162 allows for the slider to rotate and deflect in a mechanically decoupled relationship with the plate 162. Such decoupled configuration provides that the microactuators 178 can quickly and easily deflect the gimbal island 166 and slider 182 due to the lack of any spring force resistance or inertia that must be overcome if a support frame was present that was mechanically coupled to the gimbal plate 162.

That is, the gimbal island 166 provides little, if any, resistance to movement induced by the microactuators 178. In contrast, the presence of a support frame or interconnecting component that mechanically couples the island 166 to the plate 162 would include additional forces that must be overcome by the deflection forces of the microactuators 178.

Figure 5:
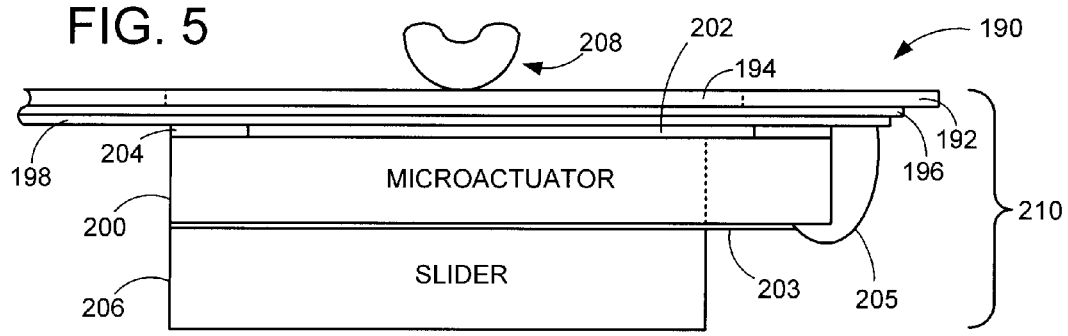
FIG. 5 shows side plan view of the exemplary head gimbal assembly of FIGS. 4A-4D.

FIG. 5 generally illustrates a side view of an exemplary HGA 190 in accordance with various embodiments of the present invention. The HGA 190 has a gimbal plate 192 with an aperture (not shown) in which a gimbal island 194 is disposed within, as shown by segmented lines in the plate 192. A flex circuit 196 is positioned adjacent the gimbal plate and island 192 and 194 and provides independent circuits in the form of electrical traces 198.

A microactuator 200 is attached to both the gimbal plate and island 192 and 194 while a top microactuator electrode 202 and bottom microactuator electrode 203 are each electrically connected to one or more traces 198 of the flex circuit 196. The top electrode can be electrically connected via node 204 while bottom electrode can be electrically connected via node 205 that is constructed of electrically conductive material and positioned over the gimbal plate 192, but such configuration is not required or limited.

The slider 206 is further attached to the gimbal island 194 between a plurality of the microactuators 200 and connected to at least one electrical trace 198 of the flex circuit 196. The HGA 190 is suspended by a dimple 208 that extends from the gimbal island 194 and allows movement of the entire HGA 190 along multiple axes. With the electrical connection of top and bottom electrodes 202 and 203, precise articulation of the slider can be facilitated with independent operation of each of the electrodes.

The configuration of the slider 206 being laterally adjacent to the microactuators 200 on the mechanically decoupled gimbal island 194 that is directly connected to the dimple 208 allows for a low overall HGA height 210, as measured from the dimple 208 to the bottom of the slider 206. The low HGA height 210 shown in FIG. 5 conserves vertical space in a data storage device, such as the device 100 of FIG. 1, that can be used to install more storage medium. Comparatively, support frames, interconnecting components, and positioning the microactuators atop a slider increases the HGA height and produces undesired results such as windage induce vibration and resonance modes.

The suspension of the HGA 190 and specifically the gimbal island 194 with the dimple 208 further reduces the preload stress on the microactuators 200 by directly carrying the load of the slider 206. Such reduction in preload stress can allow the microactuators 200 to endure operational shock without degrading abuse or damage resulting. The low HGA height 210 is also contributed to the direct electrical connection of the microactuators 200 and slider 206 via the flex circuit 196 that deforms upon deflection of the gimbal island 194. That is, the direct connections to the microactuator 200 and slider 206 allow the elimination of interconnecting components that can increase the HGA height 210.

Figure 6A:
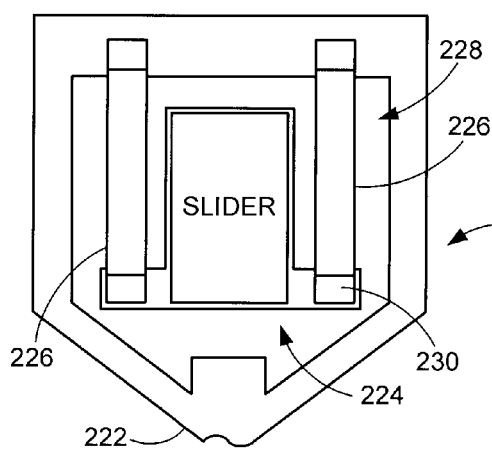
FIGS. 6A-6C display an exemplary operation of the head gimbal assembly of FIGS. 4A-4D.
Figure 6B:
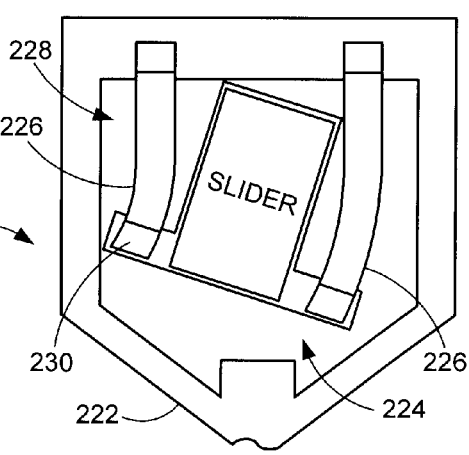
Figure 6C:
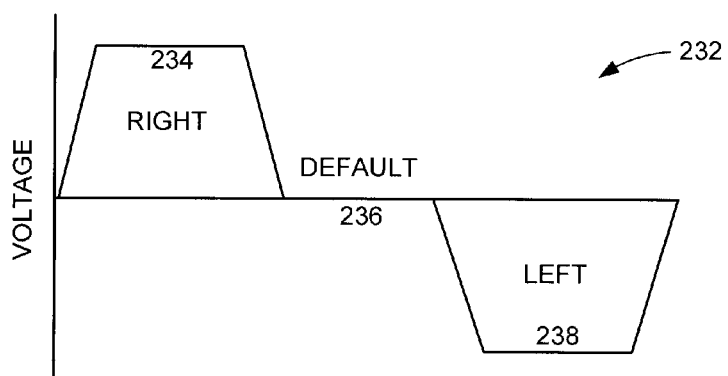

FIGS. 6A-6C display exemplary operation of a HGA 220 in accordance with various embodiments of the present invention. FIG. 6A illustrates a default slider position that is defined by the angular relationship between the gimbal plate 222 and the gimbal island 224. Such angular relationship can be characterized many ways including, but not limited to, the parallel relationship of the long axis of the slider and the sidewalls of the gimbal plate 222 and the continually parallel relationship of the long axis of the slider with the microactuators 226.

As the microactuators 226 are activated, as shown in FIG. 6B, the gimbal island will be induced to deflect within an aperture in the gimbal plate 228 due to one microactuator shrinking while the opposing microactuator extends in length. As can be appreciated, the gimbal island 224 will remain mechanically decoupled with the gimbal plate 222 despite induced deflection due to the attachment of the microactuators 226 to both the gimbal island and plate 222 and 224 via attachment portions 230.

FIG. 6C provides an exemplary microactuator control graph 232 that generally illustrates the signals used to produce the operations shown in FIGS. 6A-6B. In some embodiments, the microactuators 226 are set with opposing polarities so that a common voltage can be used to concurrently induce extension and shrinkage (contraction) of the microactuators. As a positive voltage is provided to the microactuators 226, simultaneous shrinkage and extension in a predetermined direction, such as to the right, will occur and continue until a predetermined slider deflection and voltage 234 is achieved.

While the slider could remain in a the predetermined slider direction and deflection indefinitely with a continual voltage, a removal of the positive voltage can return the HGA 220 to a default position and zero voltage 236. As desired, a positive voltage 234 could be reintroduced to the microactuators or a negative voltage 238 could be introduced to induce slider deflection in an opposing predetermined direction (not shown).

It should be noted that the predetermined direction, right and left, are merely provided for clarity and are not required. For example, positive voltage could induce leftward deflection just as negative voltage does in FIG. 6C. Further attention is drawn to the fact that the slider deflection and voltage are not required to achieve a maximum predetermined level. That is, voltage can be applied to the microactuators 226 that is less than the right and left predetermined voltages shown in FIG. 6C. The application of a lower voltage will induce a proportionately smaller deflection in the predetermined direction.

As such, a common voltage can be applied to the microactuators 226 to deflect the slider in any number of positions within the maximum deflection allowed by the configuration of the aperture 228 of the gimbal plate 222. The variety of slider positions is stabilized by the symmetric configuration of the HGA 220 that provides reduced resonance modes that could produce undesired operational characteristics.

Figure 7:
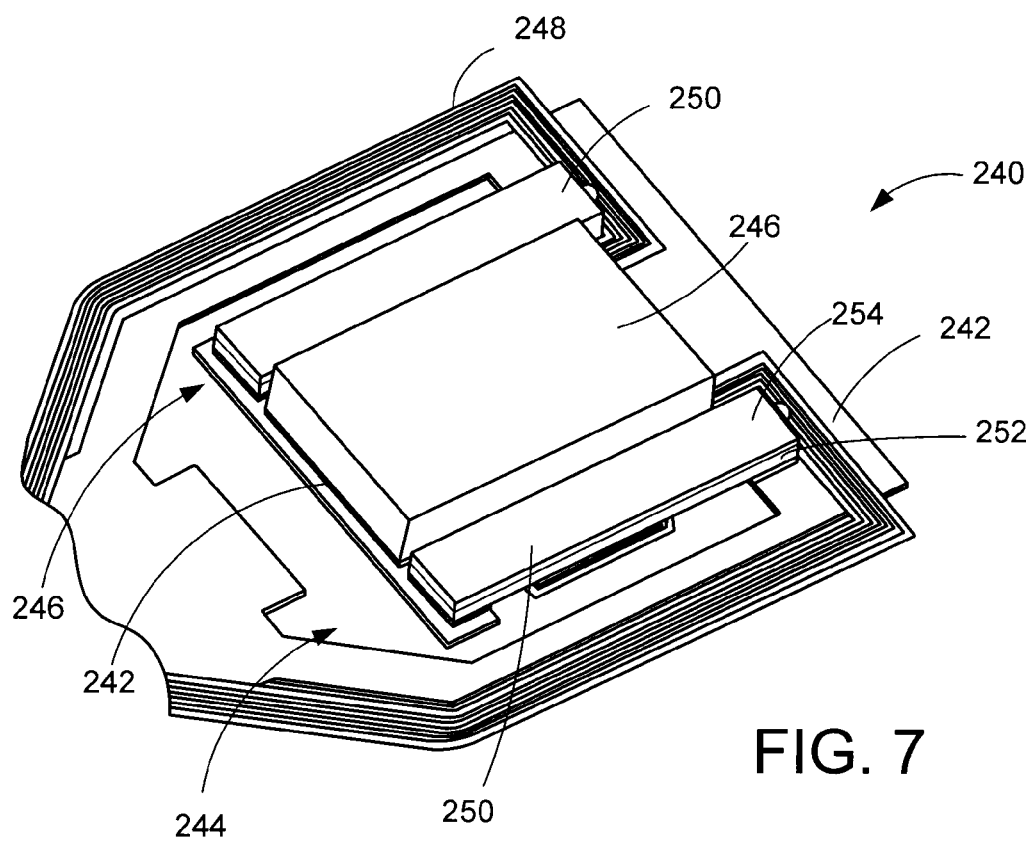
FIG. 7 provides an exemplary construction of a head gimbal assembly in accordance with various embodiments of the present invention.

FIG. 7 displays an exemplary HGA 240 structure constructed in accordance with various embodiments. A gimbal plate 242 is one such structural component that is configured with an aperture 244 that extends through the thickness of the plate 242. A gimbal island 246 is disposed within the aperture 244 of the gimbal plate 242, and is a separate member not mechanically coupled to the plate 242. The HGA 240 includes a flex circuit 248 capable of transferring electric signals to electrodes (not shown) on the gimbal island 246. The gimbal island 246 is suspended by the flex circuit 248 while remaining decoupled from the gimbal plate 242. The HGA 240 has microactuators 250 constructed of a piezoelectric material 252 and a non-piezoelectric material 254. As the microactuators 250 are activated, the gimbal island 246 will rotate and deflect, such as shown in FIGS. 3A-3C, while maintaining a mechanically decoupled relationship with the gimbal plate 242.

Figure 8:
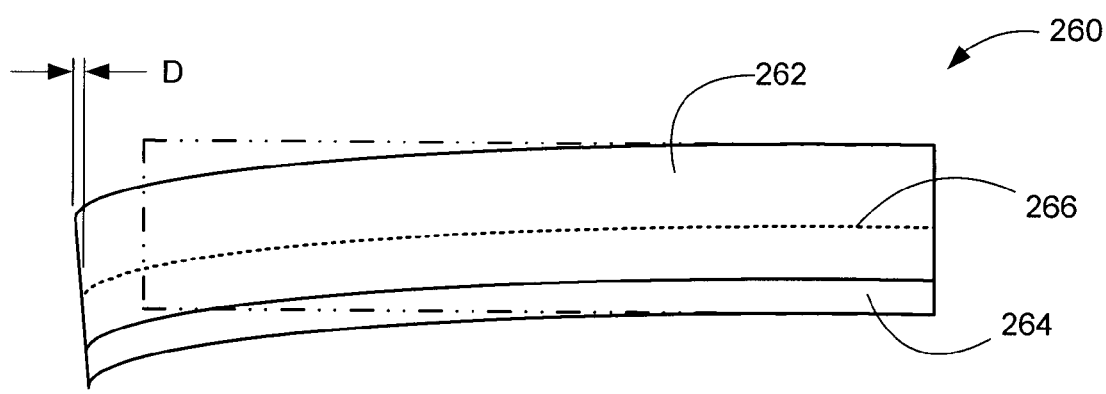
FIG. 8 illustrates exemplary operation of a microactuator in accordance with various embodiment of the present invention.

FIG. 8 shows a microactuator 260 having a piezoelectric layer 262 and a non-piezoelectric layer 264. When the microactuator 260 is not activated, the microactuator 260 will be in a default position, which is represented by phantom lines. As shown in FIG. 8, activating the microactuator 260 will cause the microactuator 260 to not only extend, but also bend because the non-piezoelectric layer 264 may not extend at the same rate as the piezoelectric layer 262. The microactuator 260 may bend about the piezoelectric layer's neutral axis 266. As a result of bending, the microactuator 260 may gain an additional linear displacement, represented by dimension D. The additional linear displacement D provides the microactuator 260 with additional rotational actuation capabilities.

Figure 9:
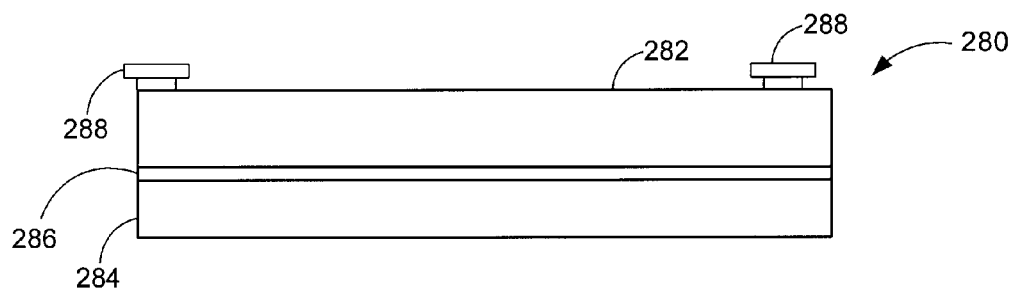
FIGS. 9-11 provides exemplary construction of a microactuator used on a head gimbal assembly in accordance with various embodiments of the present invention.

FIG. 9 illustrates a microactuator 280, for use on an HGA, having a piezoelectric layer 282 and non-piezoelectric layer 284. The non-piezoelectric layer 284 is bonded or adhered to piezoelectric layer 282 by a bonding or adhesive layer 286. The microactuator 280 is connected to a flex circuit 288, which is connected to an HGA (not shown). When activated, microactuator 280 may bend and extend.

Figure 10:
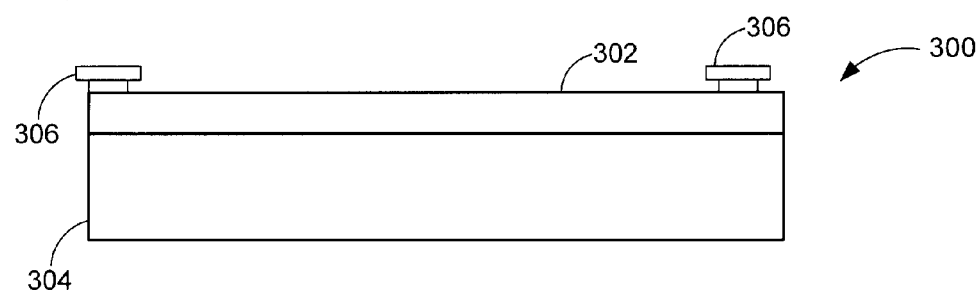

FIG. 10 illustrates a microactuator 300, for use on an HGA, having a piezoelectric layer 302 and non-piezoelectric layer 304. The piezoelectric layer 302 is deposited to the non-piezoelectric layer 304. The microactuator 300 is connected to a flex circuit 306, which is connected to an HGA (not shown). In between the piezoelectric layer 302 and the non-piezoelectric layer 304, there may be thin electrode and seed layers (not shown).

Figure 11:
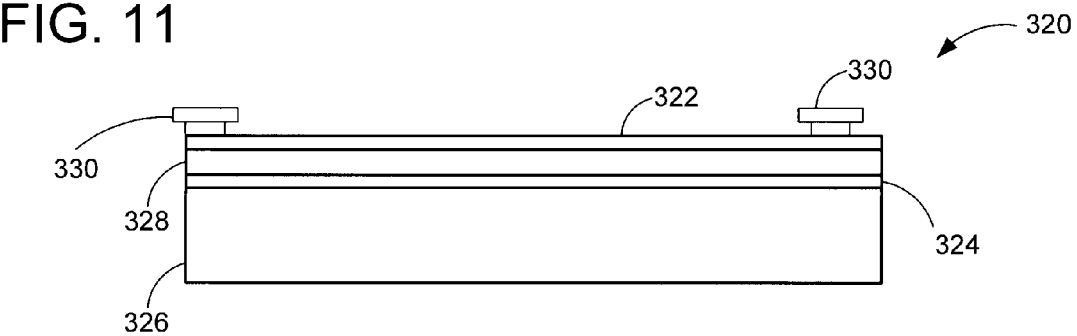

FIG. 11 illustrates a microactuator 320, for use on an HGA, having a first and second piezoelectric layer 322 and 324, a non-piezoelectric layer 326, and a bonding or adhesive layer 328. The first and second piezoelectric layers 322 and 324 are bonded or adhered together by the bonding or adhesive layer 328. The second piezoelectric layer 324 is deposited to the non-piezoelectric layer 326. The microactuator 320 is connected to a flex circuit 330, which is connected to an HGA (not shown). In between the second piezoelectric layer 324 and the non-piezoelectric layer 326, there may be thin electrode and seed layers (not shown).

Figure 12A:
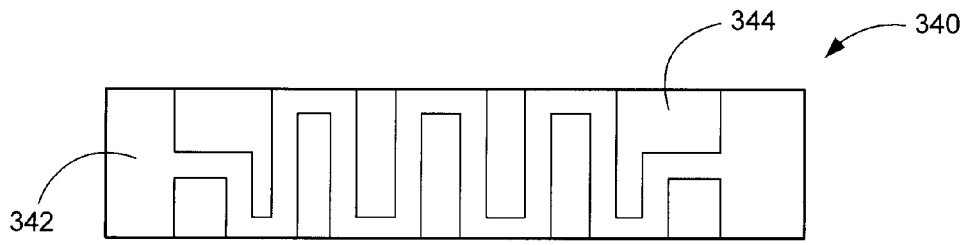
FIGS. 12A-12C provides exemplary construction of a microactuator used on a head gimbal assembly in accordance with various embodiments of the present invention.
Figure 12B:
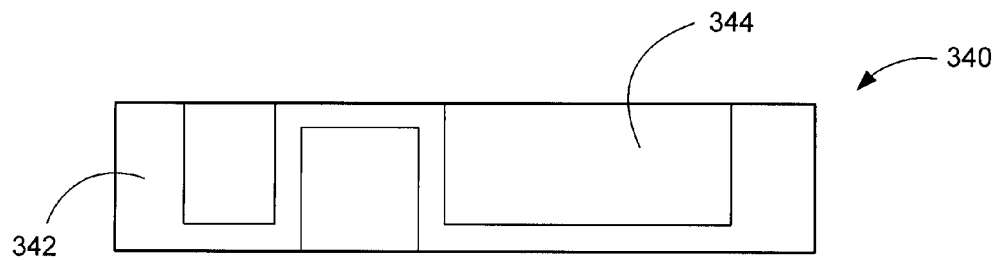
Figure 12C:
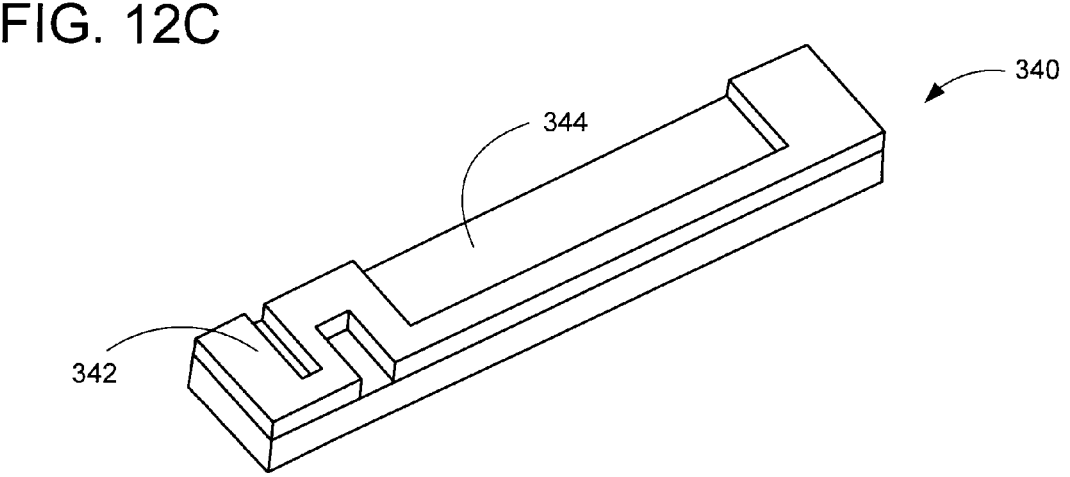

In each of the embodiments described above, the non-piezoelectric layer may be silicon or any other suitable non-piezoelectric material. The piezoelectric layer may be 1 to 150 μm thick and the non-piezoelectric layer may be 50 to 200 μm thick. In addition, the non-piezoelectric layer is not limited to covering the entire disk-facing surface of the piezoelectric layer. For example, the non-piezoelectric material may be patterned. As shown in FIGS. 12A-C, a microactuator 340 includes a non-piezoelectric material 342 patterned on a piezoelectric material 344.

Figure 13:
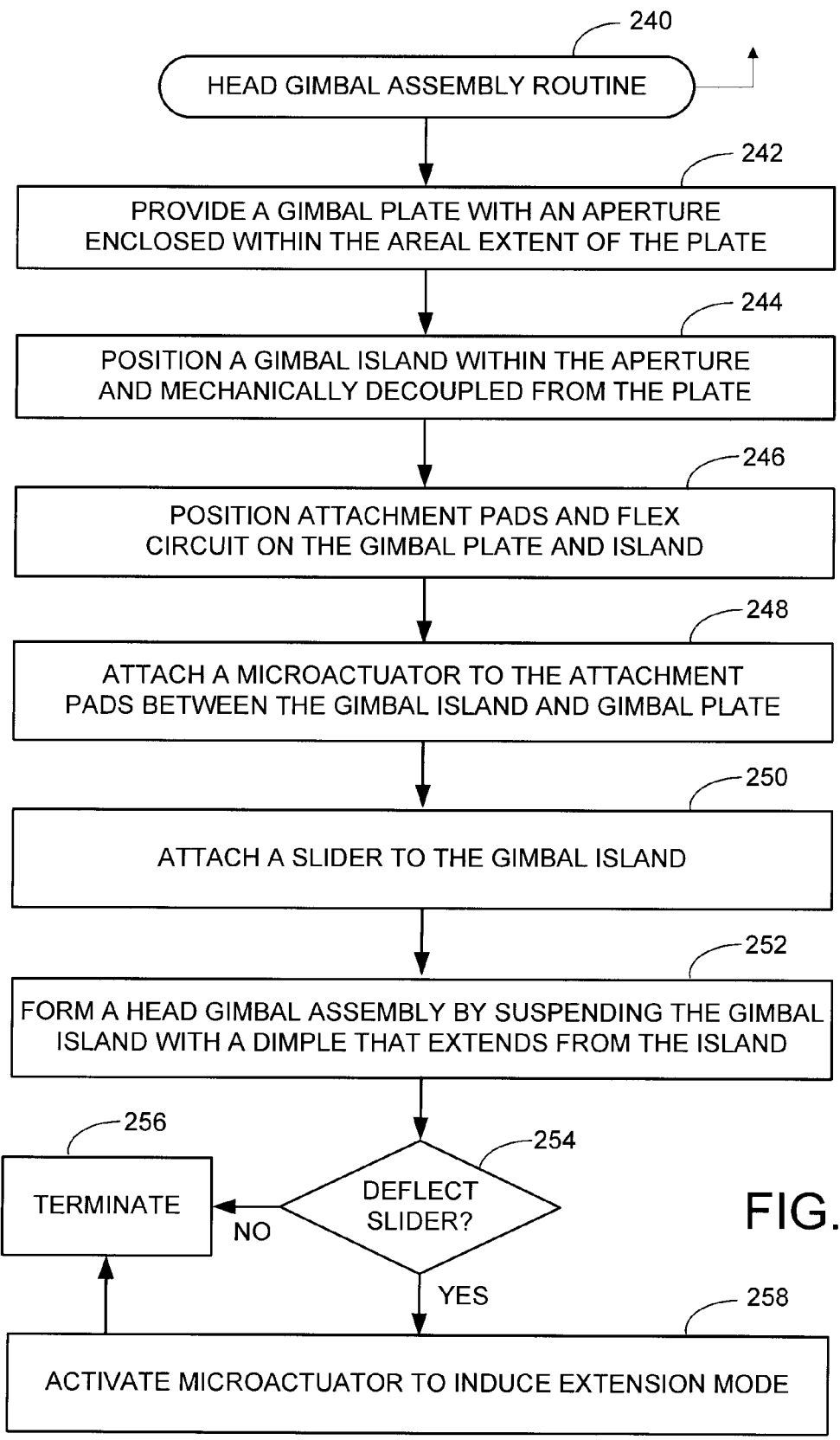
FIG. 13 provides a HEAD GIMBAL ASSEMBLY routine illustrative of steps carried out in accordance with various embodiments.

FIG. 13 provides a flow chart for a HEAD GIMBAL ASSEMBLY routine 240 in accordance with various embodiments of the present invention. The routine begins at step 242 by providing a gimbal plate with an aperture that is enclosed within the areal extent of the plate. That is, the aperture has an annular sidewall of the gimbal plate that continuously surrounds the aperture without extending past the surface area of the gimbal plate. However, it should be noted that the aperture is not limited to a circular shape and can have linear boundaries, such as the apertures shown in FIGS. 4A-4D and 6A-6B.

A gimbal island is positioned within the aperture in step 244 so that the island is mechanically decoupled from the gimbal plate. As such, the gimbal island can rotate, deflect, and vibrate without inducing movement in the gimbal plate. A flex circuit is subsequently positioned in step 246 adjacent the gimbal island and gimbal plate in combination with at least one attachment pad being positioned onto both the gimbal plate and island. In some embodiments, the flex circuit is continuously elastic along its entire length and concurrently houses multiple independent circuits that terminate on the gimbal island via electrodes.

Further in various embodiments, the microactuator attachment pads are linearly aligned so that a separate slider attachment pad and the gimbal island is in the center of the aperture of the gimbal plate. In step 248, a microactuator is secured by the attachment pads to be attached between the gimbal plate and the gimbal island. As such, the microactuator can deflect the gimbal island without inducing movement of the gimbal plate. In some embodiments, step 248 can include electrically connecting the microactuator to the flex circuit at a portion of the flex circuit that does not deform during activation of the microactuator.

A slider is attached to a predetermined portion of the gimbal island in step 250 to allow rotation and deflection independent of movement by the gimbal plate. With the gimbal island and gimbal plate positioned and electrically connected via a flex circuit, a head gimbal assembly is subsequently formed in step 252 by suspending the gimbal island with a dimple that extends from the gimbal island. That is, the gimbal island, and slider secured thereto, are directly connected and suspended by the dimple so that the center of rotation of the slider corresponds to the center of rotation of the dimple. Various embodiments have the dimple further suspending the gimbal plate via the microactuator connection between the gimbal plate and island.

As the gimbal head assembly is fully formed in step 252, step 254 is undertaken in which deflecting the slider and gimbal island is decided. If no slider deflection is desired, the routine 240 will terminate at step 256. However, if deflection is desired, predetermined signals will activate the microactuator in step 258 to induce extension in a predetermined direction in the gimbal plate aperture. As discussed above, the direction and magnitude of the deflection of the slider is not limited and can be precisely manipulated as desired during step 258.

As can be appreciated by one skilled in the art, the various embodiments illustrated herein can provide a compact HGA that provides beneficial operational characteristics. The symmetric construction of the HGA with microactuators positioned laterally adjacent to the slider can reduce resonance vibration modes while increasing slider resolution. The suspension of the mechanically decoupled gimbal island with the direct connection to the dimple allows for the elimination of interconnecting components and a small HGA height that provides improved windage and operational shock properties. It will be appreciated that the various embodiments discussed herein have numerous potential applications and are not limited to a certain field of electronic media or type of data storage devices.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   providing a gimbal island disposed within an aperture of a gimbal plate, the gimbal island being mechanically decoupled from the gimbal plate;
   attaching a microactuator element to the gimbal island and the gimbal plate to allow rotation of the gimbal island independent of the gimbal plate; and
   suspending the gimbal assembly with a dimple which extends from the gimbal island.

2. The method of claim 1, wherein the aperture has a continuously extending sidewall that encloses the gimbal island.

3. The method of claim 1, wherein a center of rotation of the gimbal island corresponds with a center of rotation of the dimple.

4. The method of claim 1, wherein the microactuator element includes a piezoelectric layer and a non-piezoelectric layer.

5. The method of claim 1, wherein the gimbal island has a slider attached thereto adjacent the microactuator element.

6. The method of claim 1, wherein the microactuator element is characterize as a first microactuator element, and wherein the attaching step further comprises attaching a second microactuator element to the gimbal island and the gimbal plate in parallel spaced apart relation to the first microactuator element.

7. The method of claim 6, wherein the attaching step further comprises attaching a slider having an air bearing surface to the gimbal island between the first and second microactuator elements.

8. The method of claim 1, wherein a flex circuit spans the aperture to provide multiple independent circuits to the gimbal island.

9. The method of claim 8, wherein the flex circuit deforms in response to deflection of the gimbal island.

10. The method of claim 1, wherein activation of the microactuator element induces movement of the gimbal island independent of the gimbal plate.

11. A gimbal assembly comprising:
    a gimbal island disposed within an aperture of a gimbal plate, the gimbal island being mechanically decoupled from the gimbal plate;
    spaced apart first and second microactuator elements each attached between the gimbal island and the gimbal plate to allow rotation of the gimbal island independent of the gimbal plate; and
    a dimple which extends from the gimbal island to suspend the gimbal assembly.

12. The apparatus of claim 11, wherein the microactuator elements are electrically connected to a flex circuit and include a piezoelectric layer and a non-piezoelectric layer.

13. The apparatus of claim 11, further comprising a slider having an air bearing surface and supporting a data transducing element, the slider connected to the gimbal island between the first and second microactuator elements.

14. The apparatus of claim 11, wherein the first microactuator element is configured with a first polarity and the second microactuator element is configured with a second polarity opposed to the first polarity.

15. The apparatus of claim 14, wherein upon activation the first microactuator element extends to increase its length while the second microactuator element contracts to decrease its length.

16. The apparatus of claim 11, wherein the first and second microactuator elements are concurrently activated by a common voltage applied thereto.

17. The apparatus of claim 12, wherein the non-piezoelectric layer forces the microactuator elements to bend from and return to a default position about a piezoelectric neutral axis.

18. A method comprising:
    providing a gimbal island disposed within an aperture of a gimbal plate, the gimbal island being mechanically decoupled from the gimbal plate;
    attaching first and second microactuator elements between the gimbal island and the gimbal plate and a slider to the gimbal island between said first and second microactuator elements;
    suspending the gimbal assembly with a dimple which extends from the gimbal island; and
    activating the microactuators to rotate the gimbal island and the slider about the dimple.

19. The method of claim 18, wherein the microactuator elements are secured to an attachment pad on both the gimbal island and gimbal plate so that a width of each microactuator contactingly engages the attachment pads, the width of each microactuator element being less than a length thereof and greater than a height thereof.

20. The method of claim 18, wherein the first and second microactuator elements are concurrently activated by a common voltage applied thereto.

* * * * *